(12) United States Patent
Koike et al.

(10) Patent No.: US 7,437,865 B2
(45) Date of Patent: Oct. 21, 2008

(54) MOWER WITH BAFFLE

(75) Inventors: Kazuo Koike, Kobe (JP); Masatoshi Yamaguchi, Izumi (JP); Yoshiyuki Esaki, Sakai (JP)

(73) Assignee: Kubota Corproation, Osaka (JP)

( * ) Notice: Subject to any disclaimer, the term of this patent is extended or adjusted under 35 U.S.C. 154(b) by 0 days.

(21) Appl. No.: 11/726,370

(22) Filed: Mar. 21, 2007

(65) Prior Publication Data

US 2008/0072561 A1 Mar. 27, 2008

(30) Foreign Application Priority Data

Sep. 21, 2006 (JP) ............................. 2006-256042
Sep. 21, 2006 (JP) ............................. 2006-256043

(51) Int. Cl.
*A01D 67/00* (2006.01)

(52) U.S. Cl. .................................................. 56/320.2

(58) Field of Classification Search ................ 56/320.2, 56/320.1, 17.4, DIG. 20, 17.5, DIG. 9, DIG. 24, 56/DIG. 22, 6
See application file for complete search history.

(56) References Cited

U.S. PATENT DOCUMENTS 5,987,863 A 11/1999 Busboom et al.
6,073,430 A * 6/2000 Mullet et al. ................. 56/13.4
2003/0154705 A1* 8/2003 Sugden et al. ............. 56/320.1
2004/0006960 A1* 1/2004 Samejima et al. ........... 56/14.7
2004/0237492 A1 12/2004 Samejima et al.

FOREIGN PATENT DOCUMENTS

| JP | 2004-041059 | 2/2004 |
| JP | 2004-041060 | 2/2004 |
| JP | 2005-095044 | 4/2005 |
| JP | 2005-253387 | 9/2005 |
| JP | 2006-020531 | 1/2006 |

* cited by examiner

*Primary Examiner*—Árpád Fábián-Kovács
(74) *Attorney, Agent, or Firm*—The Webb Law Firm

(57) ABSTRACT

A mower comprising: a cutting blade housing; rotating cutting blades; and a front baffle plate disposed forwardly of a rotation zone of each of the rotating cutting blades; wherein the front baffle plate comprises: an upstream-side cutting blade plate portion and a downstream-side cutting blade plate portion having a concave curved guide surface wherein the front baffle plate is configured such that the distance between a rotation zone of the upstream-side cutting blade and a boundary between the upstream-side cutting blade plate portion and the downstream-side cutting blade plate portion in the baffle plates is greater than the distance between the boundary and a rotation zone of the downstream-side cutting blade.

14 Claims, 7 Drawing Sheets

MOWER WITH BAFFLE

BACKGROUND OF THE INVENTION

1. Field of the Invention

The present invention relates to a baffle-equipped mower.

2. Description of the Related Art

In such a mower, cut grass produced by the rotating blades is transported by wind that is generated by the rotation of rotating cutting blades, that is guided by front baffle plates, and that flows through a cutting blade housing towards one transverse end of the cutting blade housing, and is expelled to the outside of the cutting blade housing from a cut-grass discharge port.

A conventional example of such a mower is disclosed in JP 2004-41060. The mower disclosed in JP 2004-41060 is provided with a mower deck, three rotating blades, a cut-grass discharge port, and a front baffle. The front baffle is provided with a concave-curving guide surface that faces the rotation zone of the rotating blades. The concave-curving guide surface provided to the front baffle so as to correspond to a rotating blade, which is positioned on the upper side in the flow direction of cut grass and is one of a pair of rotating blades adjacent to each other in the transverse direction of the mower deck, is placed in proximity to the rotation zone of the rotating blades along substantially the entire rotation zone in the cut-grass flow direction of the concave-curving guide surface.

In such a mower, the wind from the upstream-side cutting blade, which is positioned on the upper side in the cut-grass flow direction and which is one of the pair of rotating cutting blades that are aligned in the transverse direction of the cutting blade housing, moves into the rotation zone of the downstream-side cutting blade while combining with the wind from the downstream-side cutting blade, which is positioned on the lower side in the cut-grass flow direction and is the other of the pair of rotating blades, passes through the rotation zone, and flows towards the cut-grass discharge port. When the technique that involves the above-described conventional front baffle plates is applied, air turbulence or a strong wind directed downward from the cutting blade housing occurs where the wind from the upstream-side cutting blade combines with the wind from the downstream-side cutting blade, and the grass can fall downward. Uncut or inadequately cut grass therefore occurs in the trajectory of cutting by the upstream-side cutting blade or the downstream-side cutting blade, and other drawbacks occur, making it difficult to obtain a satisfactory cutting trajectory.

SUMMARY OF THE INVENTION

An object of the present invention is to provide a mower capable of overcoming such drawbacks of the prior art as those described above.

The mower according to the present invention comprises:

a cutting blade housing that opens downward and has a forward direction, and has a top plate and a front vertical wall that depends from the top plate, the cutting blade housing being provided with a cut-grass discharge port;

rotating cutting blades that are arranged in a transverse direction of the cutting blade housing and each of which is capable of rotating about a vertical axis inside the cutting blade housing; and a front baffle plate disposed forwardly of a rotation zone of each of the rotating cutting blades so as to guide a flow of cut grass towards the cut-grass discharge port from the rotating cutting blades; wherein the front baffle plate comprises:

an upstream-side cutting blade plate portion having a curved guide surface that conforms to a rotation trajectory of an upstream-side cutting blade that is one of a pair of adjacent rotating cutting blades and is disposed upstream with respect to a cut grass flow direction; and a downstream-side cutting blade plate portion having a concave curved guide surface that corresponds to a rotation zone of a downstream-side cutting blade that is disposed downstream with respect to a cut grass flow direction and is the other of the pair of adjacent rotating cutting blades; and wherein the baffle plates are configured so that the distance between a rotation zone of the upstream-side cutting blade and a boundary between the upstream-side cutting blade plate portion and the downstream-side cutting blade plate portion in the baffle plates is greater than the distance between the boundary and a rotation zone of the downstream-side cutting blade; and the distance between a rotation zone of the upstream-side cutting blade and a portion of the upstream-side cutting blade plate portion from a vicinity of a position in which a rotation trajectory of the upstream-side cutting blade intersects with an imaginary line that extends perpendicular to the forward direction and through a center axis of the upstream-side cutting blade to the boundary gradually increases toward the boundary.

DESCRIPTION OF THE PREFERRED EMBODIMENTS

Figure 1:
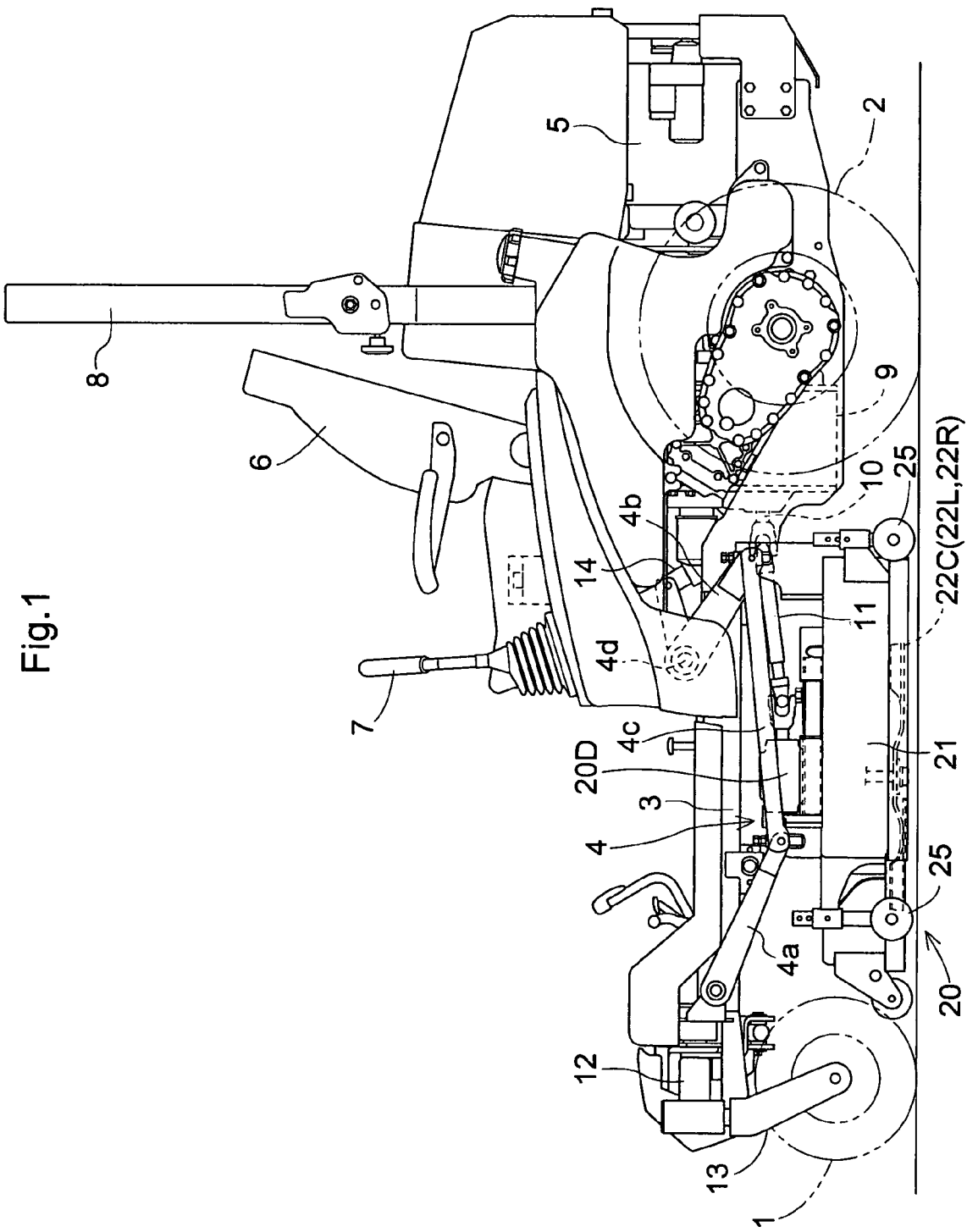
FIG. 1 is a side view showing the entire riding mower.
Figure 2:
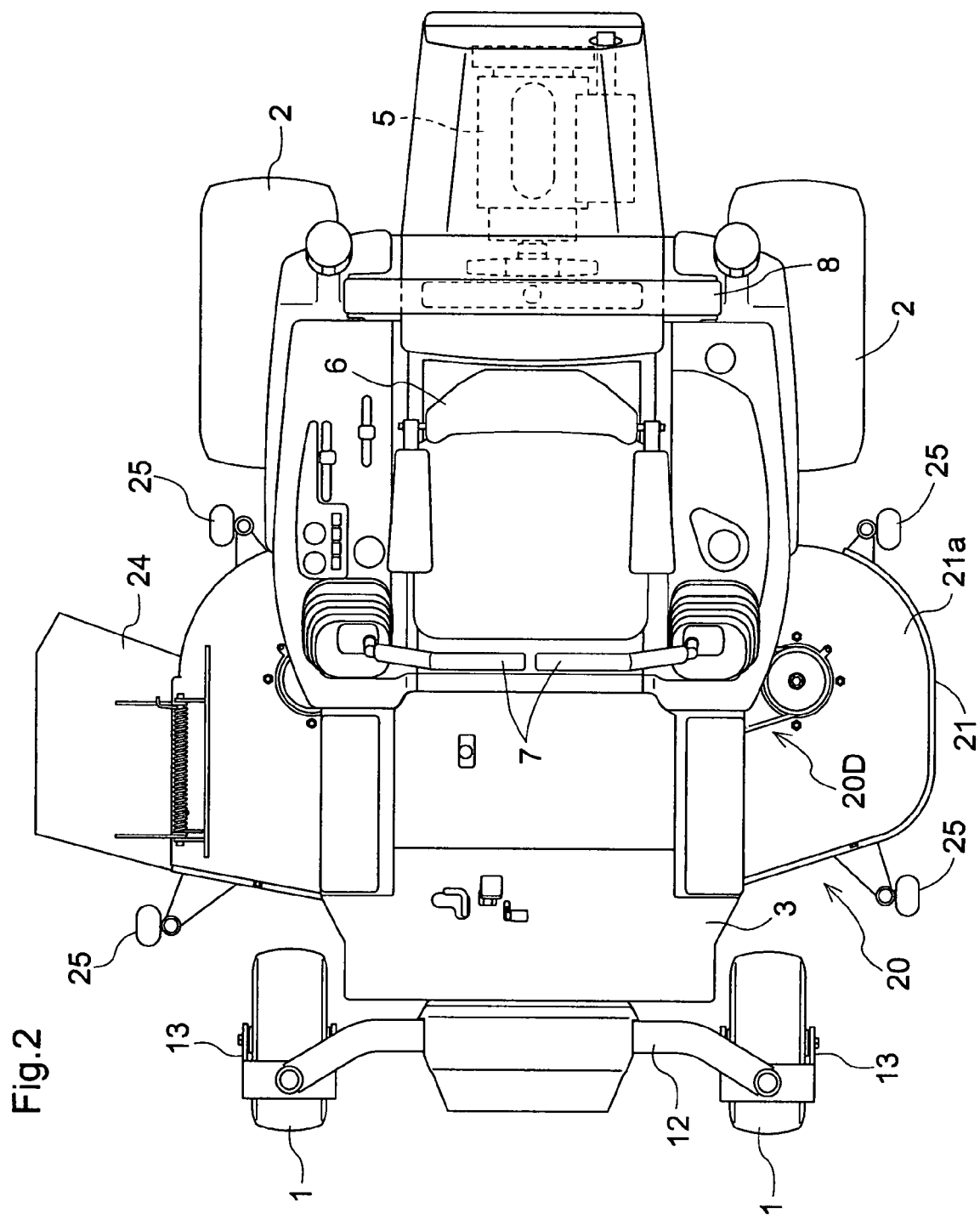
FIG. 2 is a plan view showing the entire riding mower.

Preferred embodiments of the present invention will be described hereinafter based on the accompanying drawings. FIG. 1 is a side view showing the entire riding mower. FIG. 2 is a plan view showing the entire riding mower. As shown in these drawings, the riding mower is provided with a self-propulsion unit having a pair of left and right front wheels 1, 1 and a pair of left and right rear wheels 2, 2; and a mower 20 that is mounted between the front wheels 1 and the back wheels 2 of a body frame 3 of the self-propulsion unit via a link mechanism 4.

The riding mower performs a grass mowing operation.

Specifically, during operation of a raising and lowering cylinder 14 connected to a support shaft 4*d* that supports a pair of left and right rear pivot links 4*b*, 4*b* of the link mechanism 4 so that the pair can pivot together in an integral fashion, the link mechanism 4 is swung upward and downward in relation to the body frame 3 by the lifting and lowering cylinder 14, and the mower 20 is raised and lowered between a lowered working state in which a gauge shaft 25 is in contact with the ground surface, and a raised non-working state in which the gauge shaft 25 is raised from the ground surface. When the mower 20 is placed in the lowered working state, and the self-propulsion unit is caused to travel, the mower 20 cuts grass or turf using three rotating cutting blades 22L, 22C, 22R (see FIG. 3) positioned within a cutting blade housing 21.

The cut grass or cut turf (hereinafter referred to as cut grass) is conveyed through the inside of the cutting blade housing 21 by wind generated by the rotation of the rotating cutting blades 22L, 22C, 22R to a cut-grass discharge port 23 (see FIG. 3) positioned at one transverse end of the cutting blade housing 21, and the cut grass is discharged from the side of the self-propulsion unit while being guided from the cut-grass discharge port 23 by a discharge guide 24.

The self-propulsion unit will be described in detail.

The self-propulsion unit is provided with the aforementioned pair of left and right front wheels 1, 1 and the pair of left and right rear wheels 2, 2, as well as with a drive source unit having an engine 5 mounted to the rear portion of the body; an operating unit having a driver seat 6 and a pair of left and right control levers 7, 7; a roll protection frame 8 positioned near the back of the driver seat 6; a transmission device 9 that supports the left and right rear wheels 2, 2; and a rotating shaft 11 whereby the drive force of a drive power shaft 10 positioned at the front of the transmission device 9 is transmitted to a cutting blade drive mechanism 20D of the mower 20. The left and right front wheels 1 are supported via a front wheel support fork 13 so as to be able to idle at the end portion of a front wheel support frame 12 that is connected to the front portion of the body frame 3. The left and right front wheels 1 are steered from side to side in relation to the front wheel support frame 12 along with the front wheel support fork 13. The left and right rear wheels 2, 2 are driven separately by a pair of hydrostatic transmission devices (not shown) provided to the transmission device 9, and are independently stopped and accelerated forward and backward by the independent accelerating action of the pair of hydrostatic transmission devices via the pair of left and right control levers 7, 7.

The link mechanism 4 will next be described in detail.

The link mechanism 4 is composed of a pair of left and right front pivot links 4a, 4a that are connected over the front ends of the body frame 3 and the cutting blade housing 21 of the mower 20 so that the front end of the mower 20 can be raised and lowered by the body frame 3; a pair of left and right rear pivot links 4b, 4b that are connected over the rear ends of the body frame 3 and the cutting blade housing 21 so that the rear end of the mower 20 can be raised and lowered by the body frame 3; and a coupling link 4c that is connected between the front pivot links 4a and the rear pivot links 4b on the left and right sides.

Figure 3:
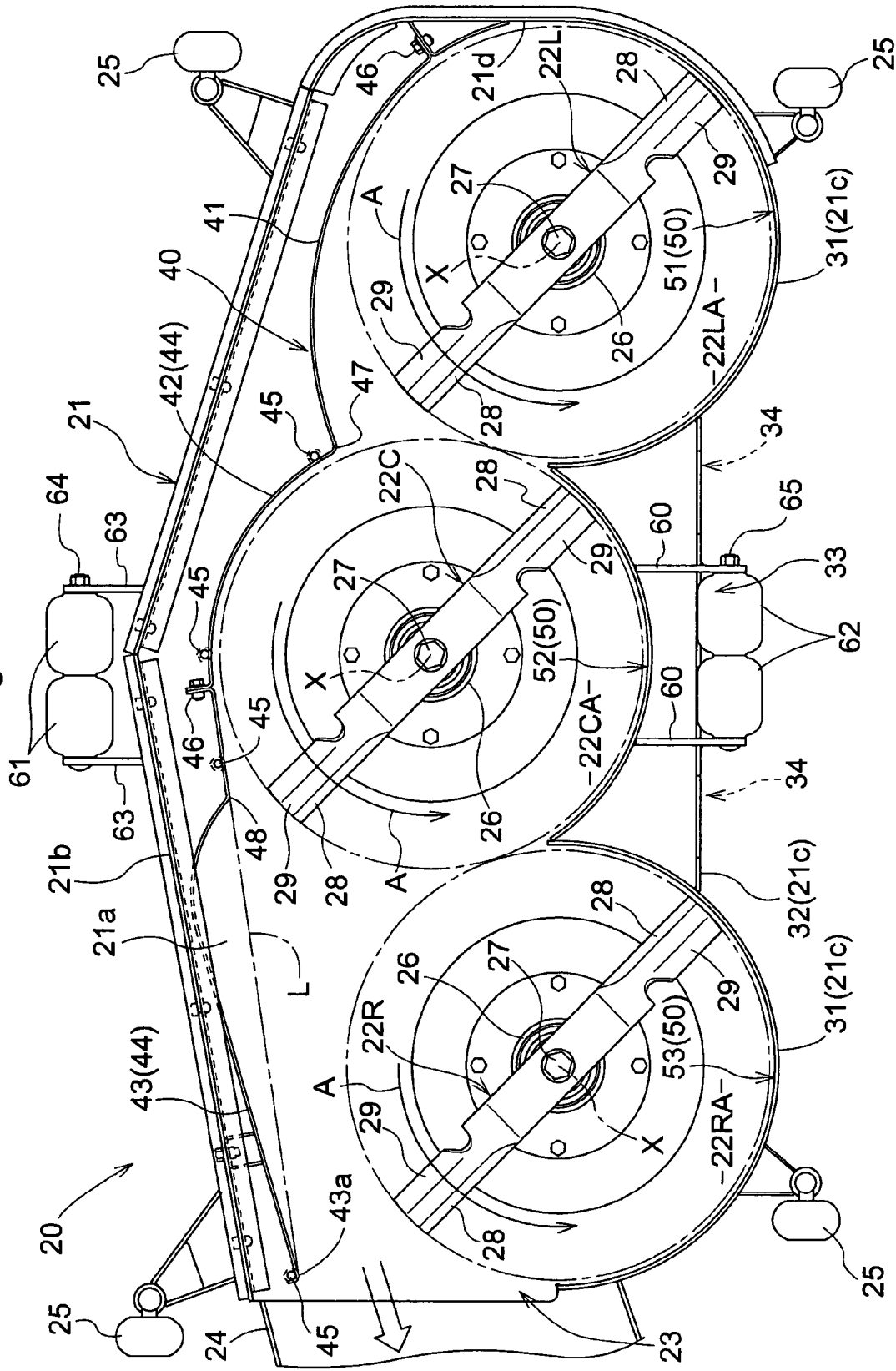
FIG. 3 is a bottom view showing the mower.
Figure 4:
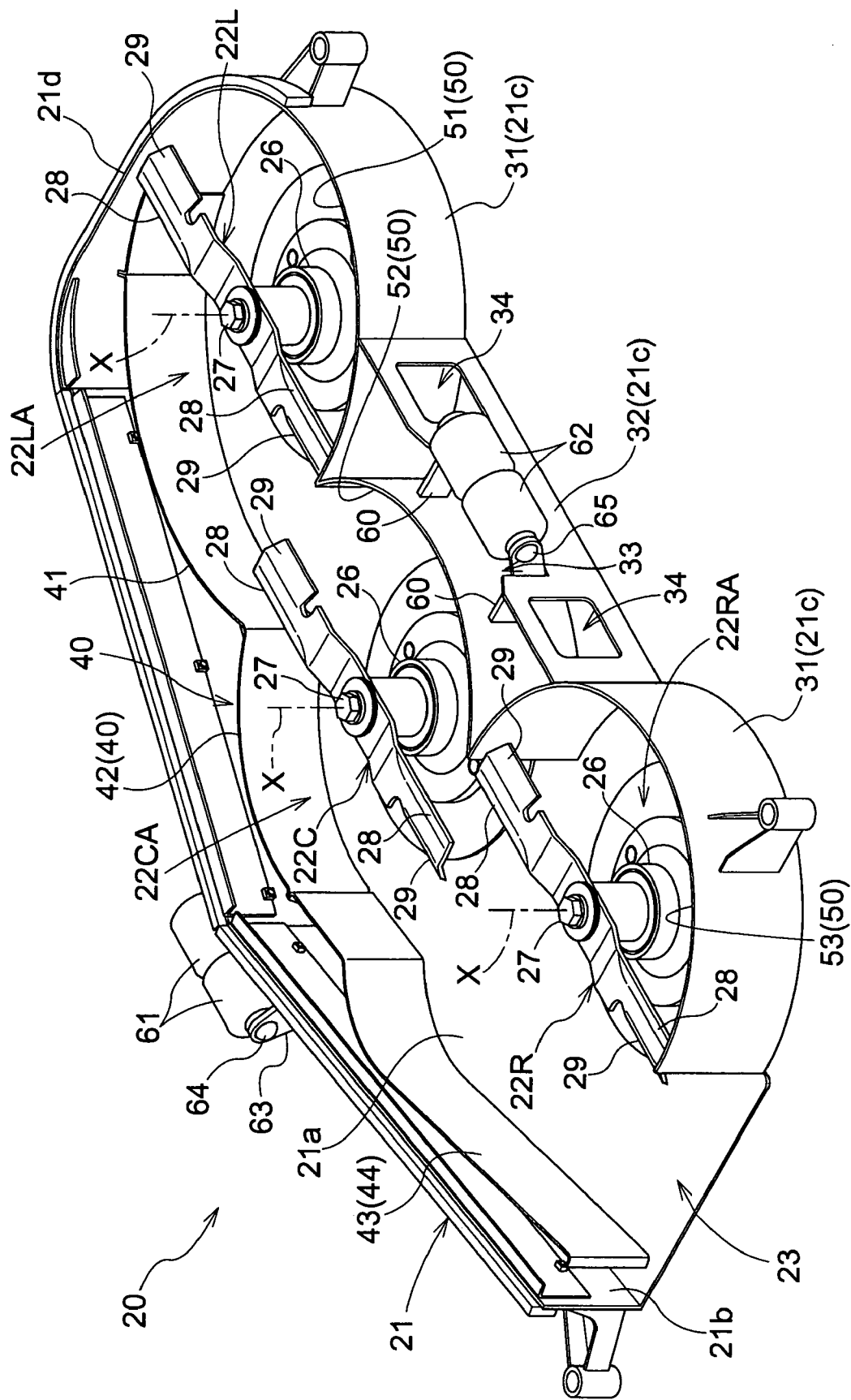
FIG. 4 is a perspective view showing the mower.

The mower 20 will next be described in detail. FIG. 3 is a bottom view of the mower 20. FIG. 4 is a perspective view from the bottom side of the mower 20.

As shown in the drawings, the mower 20 is provided with the cutting blade housing 21, the three rotating cutting blades 22L, 22R, 22C, the cut-grass discharge port 23, and the gauge shaft 25, as well as a front baffle plate 40 provided forwardly of the rotating cutting blades 22L, 22C, 22R and inside the cutting blade housing 21, and a rear baffle plate 50 provided behind the rotating cutting blades 22L, 22C, 22R and inside the cutting blade housing 21.

The cutting blade housing 21 is composed of a top plate 21a, a front vertical wall 21b that extends below the cutting blade housing from the chevron-shaped front edge portion of the top plate 21a, a rear vertical wall 21c that extends below the cutting blade housing from the rear edge portion of the top plate 21a, and a transverse vertical wall 21d that extends below the cutting blade housing from the transverse end portion of the top plate 21a. The cutting blade housing 21 is in the shape of a container that opens downward from the self-propulsion unit. The rear vertical wall 21c is provided with arcuate end portion walls 31 positioned at both end portions of the rear vertical wall 21c in the transverse direction of the cutting blade housing that have an arcuate shape as viewed in the vertical direction of the cutting blade housing, and a linear middle wall portion 32 that is positioned between the pair of arcuate end portion walls 31, 31 and is linear as viewed in the vertical direction of the cutting blade housing. The cut-grass discharge port 23 of the cutting blade housing 21 is formed by the end portions of the top plate 21a, the front vertical wall 21b, and the rear vertical wall 21c.

As shown in FIGS. 3 and 4, the rear vertical wall 21c has a ventilation hole 33 provided in the center region of the linear middle wall portion 32, which is a region positioned in the center portion of the rear vertical wall 21c in the transverse width direction of the cutting blade housing; and second ventilation holes 34 provided to the linear middle wall portion 32 and disposed on both sides of the ventilation hole 33. The second ventilation holes 34 and the ventilation hole 33 are positioned in relation to each other so as to be on both sides of a support member 60 that is closer to the second ventilation holes 34 and is one of a pair of left and right sheet-metal support members 60, 60 inserted through the ventilation hole 33 and connected across the linear middle wall portion 32 and the rear baffle plate 50 in the portion 52 of the plate that corresponds to the center cutting blade. The second ventilation holes 34 are disposed near the support members 60 on the other side of the ventilation hole 33.

As shown in FIGS. 3 and 4, the three rotating cutting blades 22L, 22C, 22R are arranged in the transverse direction of the cutting blade housing. Among the three rotating cutting blades 22L, 22C, 22R, the center rotating cutting blade 22C (hereinafter referred to as the center cutting blade 22C) positioned in the center in the transverse direction of the cutting blade housing is positioned somewhat towards the front of the cutting blade housing in relation to the uppermost rotating cutting blade 22L (hereinafter referred to as the uppermost cutting blade 22L), which is farthest away from the cut-grass discharge port 23 and which is positioned furthest upstream in the flow direction of cut grass, and in relation to the rotating cutting blade 22R (hereinafter referred to as the cutting blade 22R closest to the discharge port) that is positioned the closest to the cut-grass discharge port 23. The rotating cutting blades 22L, 22C, 22R are supported while allowed to rotate together in an integral fashion on the lower end portions of cutting blade drive shafts 27, which are themselves supported so as to be able to rotate via support members 26 formed by bearing support cases in the top plate 21a of the cutting blade housing 21. The rotating cutting blades 22L, 22C, 22R thereby rotate along with the cutting blade drive shafts 27 about the central axes X that extend in the vertical direction of the cutting blade housing in which the cutting blade drive shafts 27 are provided. The rotating cutting blades 22L, 22C, 22R have cutting blades 28 that are provided to both end portions of the rotating cutting blades 22L, 22C, 22R; and wind-generating vanes 29 that are provided behind the cutting blades 28.

The front baffle plate 40 is provided with an uppermost cutting blade plate portion 41 positioned forwardly of the rotation zone 22LA (the circumference of which is the rotation trajectory, indicated by the dashed line) of the uppermost cutting blade 22L; and an discharge-end plate portion 44 that is positioned between the cut-grass discharge port 23 and the uppermost cutting blade plate portion 41. The discharge-end plate portion 44 is provided with a center cutting blade plate portion 42 positioned forwardly of the rotation zone 22CA (the circumference of which is the rotation trajectory, indicated by the dashed line) of the center cutting blade 22C, and a plate portion 43 designed for the cutting blade closest to the discharge port and positioned forwardly of the rotation zone 22RA of the cutting blade 22R closest to the discharge port. The front baffle plate 40 is connected to the top plate 21a of the cutting blade housing 21 by fastening rods 45 connected in a plurality of locations in the longitudinal direction of the front baffle plate 40. The front baffle plate 40 is composed of three dividing band plates that are arranged in the longitudinal direction of the front baffle plate 40 and are connected by connecting screws 46.

The uppermost cutting blade plate portion 41 is provided with a concave curved guide surface 41a (see FIG. 6) that faces the rotation zone 22LA of the uppermost cutting blade 22L. The flow of wind generated in the rotation zone 22LA by the uppermost cutting blade 22L through the rotation of the wind-generating vanes 29 is guided by the concave curved guide surface 41a toward the rotation zone 22CA of the center cutting blade 22C. The wind that is guided so as to flow from the uppermost cutting blade 22L to the rotation zone 22CA conveys the grass cut by the cutting blades 28 of the uppermost cutting blade 22L into the rotation zone 22CA of the center cutting blade 22C.

The center cutting blade plate portion 42 is provided with a concave curved guide surface 42a (see FIG. 6) that faces the rotation zone 22CA of the center cutting blade 22C. The flow of wind generated in the rotation zone 22CA by the center cutting blade 22C through the rotation of the wind-generating vanes 29, and the flow of wind entering the rotation zone 22CA from the uppermost cutting blade 22L are guided by the concave curved guide surface 42a toward the cut-grass discharge port 23. The wind that is guided so as to flow from the rotation zone 22CA to the cut-grass discharge port 23 conveys the cut grass that enters the rotation zone 22CA from the uppermost cutting blade 22L, as well as the grass that is cut by the cutting blades 28 of the center cutting blade 22C, to the cut-grass discharge port 23.

Figure 6:
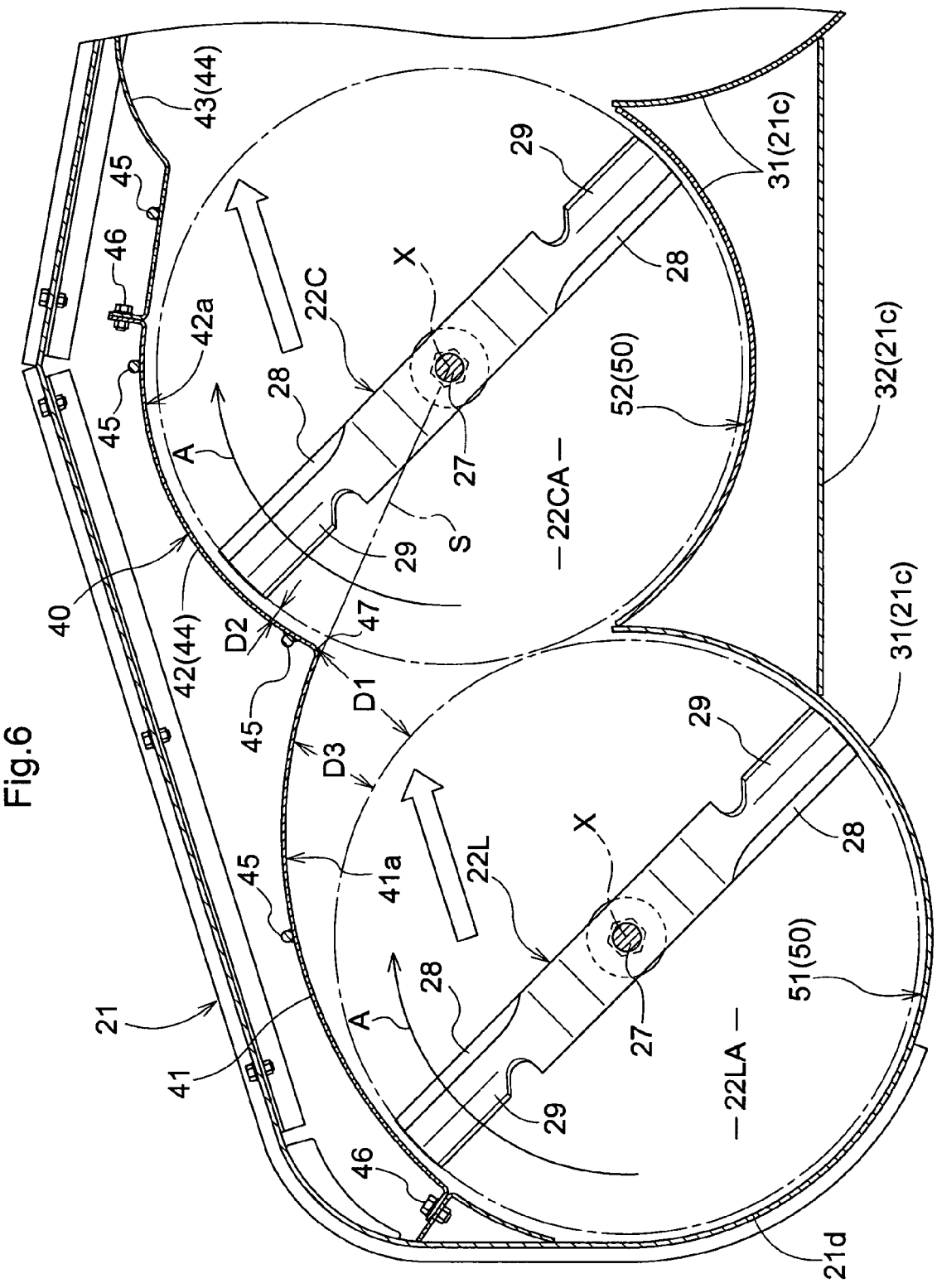
FIG. 6 is a transverse plan view showing one transverse end portion of the mower.

FIG. 6 is a transverse plan view showing one transverse end portion (transverse end portion on the opposite side from the cut-grass discharge port 23) of the mower 20. The plate portion provided with the uppermost cutting blade plate portion 41 and with the center cutting blade plate portion 42 of the front baffle plate 40 is configured as shown in FIG. 6. Specifically, a boundary 47 positioned further toward the position of the uppermost cutting blade 22L in relation to the center axis of rotation X of the center cutting blade 22C forwardly of the rotation zone 22CA is provided to the plate portion that has the uppermost cutting blade plate portion 41 and the center cutting blade plate portion 42 of the front baffle plate 40. This boundary 47 is the boundary between the uppermost cutting blade plate portion 41 and the center cutting blade plate portion 42. The boundary 47 is formed by the bending point of the bent band plate that forms the front baffle plate 40. The portion in which the uppermost cutting blade plate portion 41 and the center cutting blade plate portion 42 of the front baffle plate 40 are provided is configured such that the distance D1 between the boundary 47 and the rotation zone 22LA of the uppermost cutting blade 22L is greater than the distance D2 between the boundary 47 and the rotation zone 22CA of the center cutting blade 22C. The portion that has the uppermost cutting blade plate portion 41 and the center cutting blade plate portion 42 of the front baffle plate 40 is configured such that a distance D3 sufficiently large to reach the boundary 47 is provided between the rotation zone 22LA of the uppermost cutting blade 22L, and the concave curved guide surface 41a of the uppermost cutting blade plate portion 41 in the region located in the vicinity of the boundary 47 of the uppermost cutting blade plate portion 41. The uppermost cutting blade plate portion 41 is configured such that an extension line S from the boundary 47 that extends so as to conform to the concave curved guide surface 41a of the uppermost cutting blade plate portion 41 passes through the center axis of rotation X of the center cutting blade 22C and the rotation zone 22CA of the center cutting blade 22C.

The uppermost cutting blade plate portion 41 thereby forms a wind channel having the appropriate width and shape between the rotation zone 22LA and the rotation zone 22CA, making it more difficult for air turbulence or a strong wind directed downward from the cutting blade housing to form when the wind from the uppermost cutting blade 22L flows into the rotation zone 22CA while combining with the wind from the center cutting blade 22C in the wind channel.

Figure 7:
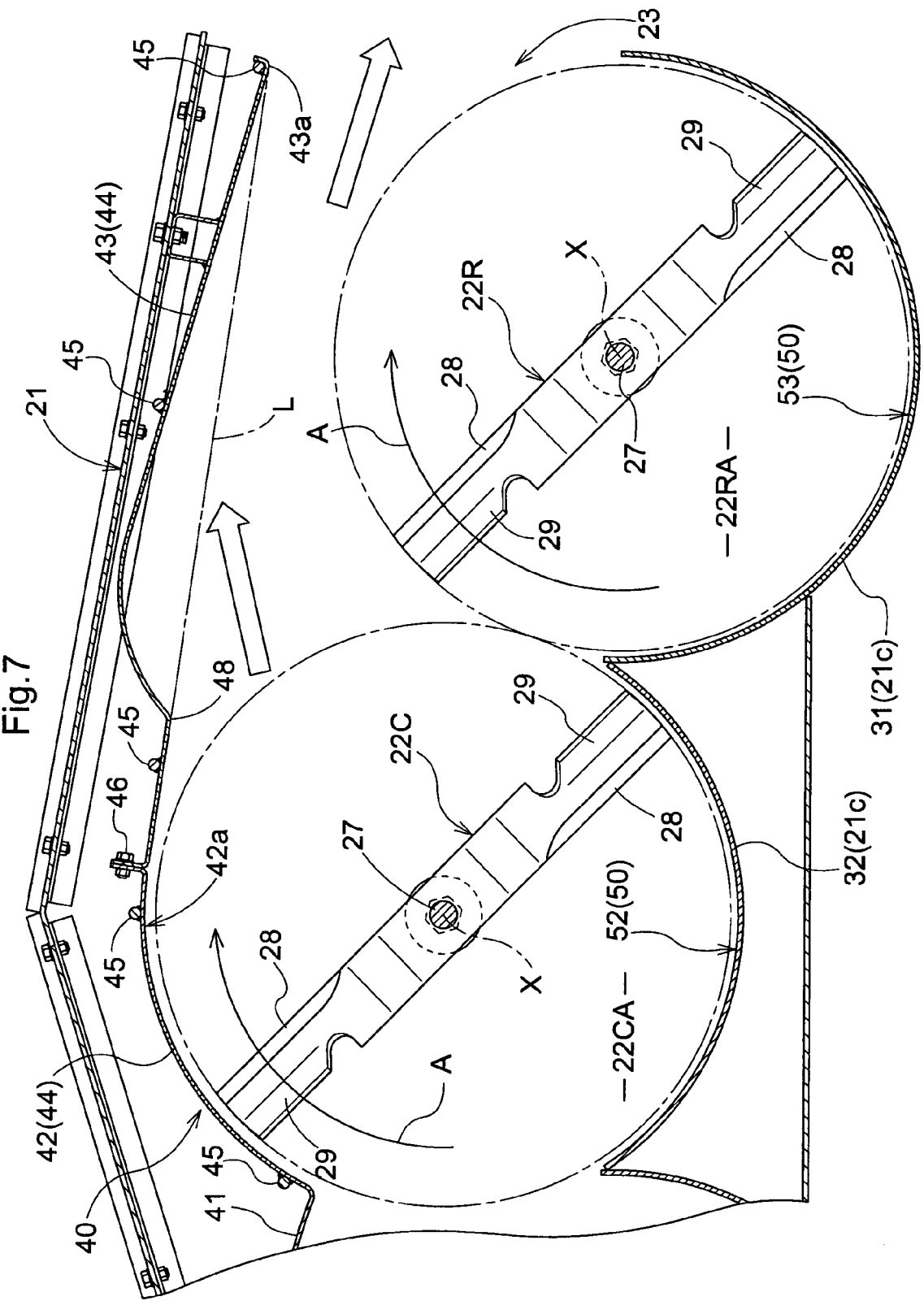
FIG. 7 is a transverse plan view showing the other transverse end portion of the mower.

FIG. 7 is a transverse plan view showing the other transverse end portion (transverse end portion on the side in which the cut-grass discharge port 23 is positioned) of the mower 20. As shown in FIG. 7, the discharge-end plate portion 44 of the front baffle plate 40 is provided with a bending point 48 disposed towards the position of the cut-grass discharge port 23 in relation to the center axis of rotation X of the center cutting blade 22C forwardly of the rotation zone 22CA. The bending point 48 is the point (also referred to as the connecting point or connecting region) at which the discharge-end plate portion 44 is bent in the forward-rearward direction of the cutting blade housing between the center cutting blade plate portion 42 and the plate portion 43 for the cutting blade closest to the discharge port. The plate portion 43 for the cutting blade closest to the discharge port is the downstream-side plate portion positioned further downward in the flow guide direction than the bending point 48 of the discharge-end plate portion 44. The plate is disposed further forward in the cutting blade housing than a straight line L that passes through the bending point 48 and the flow guide endpoint 43a of the plate portion 43 for the cutting blade closest to the discharge port.

The discharge-end plate portion 44 thereby forms a confluence space that has an appropriate width and extends between the rotation zones 22CA and 22RA and into the vicinity of the two zones. This portion forms a wind channel having an appropriate width between the confluence space and the cut-grass discharge port 23. It is also more difficult for air turbulence or a strong wind directed downward from the cutting blade housing to form when the wind from the center cutting blade 22C and the wind from the cutting blade 22R closest to the discharge port flow together in the confluence space, and the strong wind is guided through the wind channel to the cut-grass discharge port 23 by the plate portion 43 for the cutting blade closest to the discharge port.

The rear baffle plate 50 is provided with a portion 51 that corresponds to the uppermost cutting blade 22L, a portion 52 that corresponds to the center cutting blade 22C, and a portion 53 that corresponds to the cutting blade 22R closest to the discharge port. The portion 51 that corresponds to the uppermost cutting blade forms an arcuate shape that conforms to the rotation zone 22LA of the uppermost cutting blade 22L as viewed in the vertical direction of the cutting blade housing. A portion of the portion 51 that corresponds to the uppermost cutting blade is formed by the arcuate end portion walls 31. The portion 52 that corresponds to the center cutting blade forms an arcuate shape that conforms to the rotation zone 22CA of the center cutting blade 22C as viewed in the vertical direction of the cutting blade housing. The portion 53 that corresponds to the cutting blade closest to the discharge port forms an arcuate shape that conforms to the rotation zone 22RA of the cutting blade 22R closest to the discharge port as viewed in the vertical direction of the cutting blade housing.

A portion of the portion 53 that corresponds to the cutting blade closest to the discharge port is formed by the arcuate end portion walls 31.

Specifically, the drive power of the engine 5 is transmitted to the cutting blade drive mechanism 20D by the rotating shaft 11, and the cutting blade drive shafts 27 are driven by the cutting blade drive mechanism 20D, whereby the rotating cutting blades 22L, 22C, 22R are driven in the rotation direction A shown in FIG. 3 about the vertical center axis X of the cutting blade drive shafts 27 in the cutting blade housing. The uppermost cutting blade 22L and the cutting blade 22R closest to the discharge port, through the blowing action of the wind-generating vanes 29, then introduce the air outside the cutting blade housing 21 into the rotation zones 22LA, 22RA from below the front vertical wall 21b, the transverse vertical wall 21d, and the rear vertical wall 21c of the cutting blade housing 21 to create an airflow, and turf and grass are cut by the cutting blades 28 while being drawn upright by the airflow. Through the blowing action of the wind-generating vanes 29, the center cutting blade 22C introduces the air outside the cutting blade housing 21 to the rotation zone 22CA from below the front vertical wall 21b of the cutting blade housing 21, and also from the ventilation hole 33, from the second ventilation holes 34, and from below the rear vertical wall 21c, through the area below the rear baffle plate 50 to create an airflow, and the turf and grass are cut by the cutting blades 28 while being drawn upright by the airflow. The gauge shafts 25 in contact with the ground surface support the cutting blade housing 21 in contact with the ground surface, and maintain the rotating cutting blades 22L, 22C, 22R at the set height above the ground as the set mowing height. The moving height of the rotating cutting blades 22L, 22C, 22R is thereby set as the set mowing height. The grass that is cut by the rotating cutting blades 22L, 22C, 22R is guided by the rear baffle plate 50 and the front baffle plate 40 into the wind generated by the wind-generating vanes 29 of the rotating cutting blades 22L, 22C, 22R, is conveyed through the cutting blade housing 21 to the transverse end at which the cut-grass discharge port 23 is positioned, and is discharged sideways to the outside of the cutting blade housing 21 from the cut-grass discharge port 23.

As shown in FIG. 3, the mower 20 has pairs of ground rollers 61, 61, 62, 62 disposed in the transverse direction of the cutting blade housing forwardly of and behind the center portion in the transverse direction of the cutting blade housing 21.

The front pair of left and right ground rollers 61, 61 is supported so as to be capable of rotating via a support shaft 64 on a pair of left and right support members 63 connected to the front vertical wall 21b of the cutting blade housing 21. When a protrusion in the ground surface or another obstacle is encountered, the front pair of left and right ground rollers 61, 61 rolls over the obstacle while supporting the front end of the cutting blade housing 21 near the ground so as not to strike the obstacle.

Figure 5:
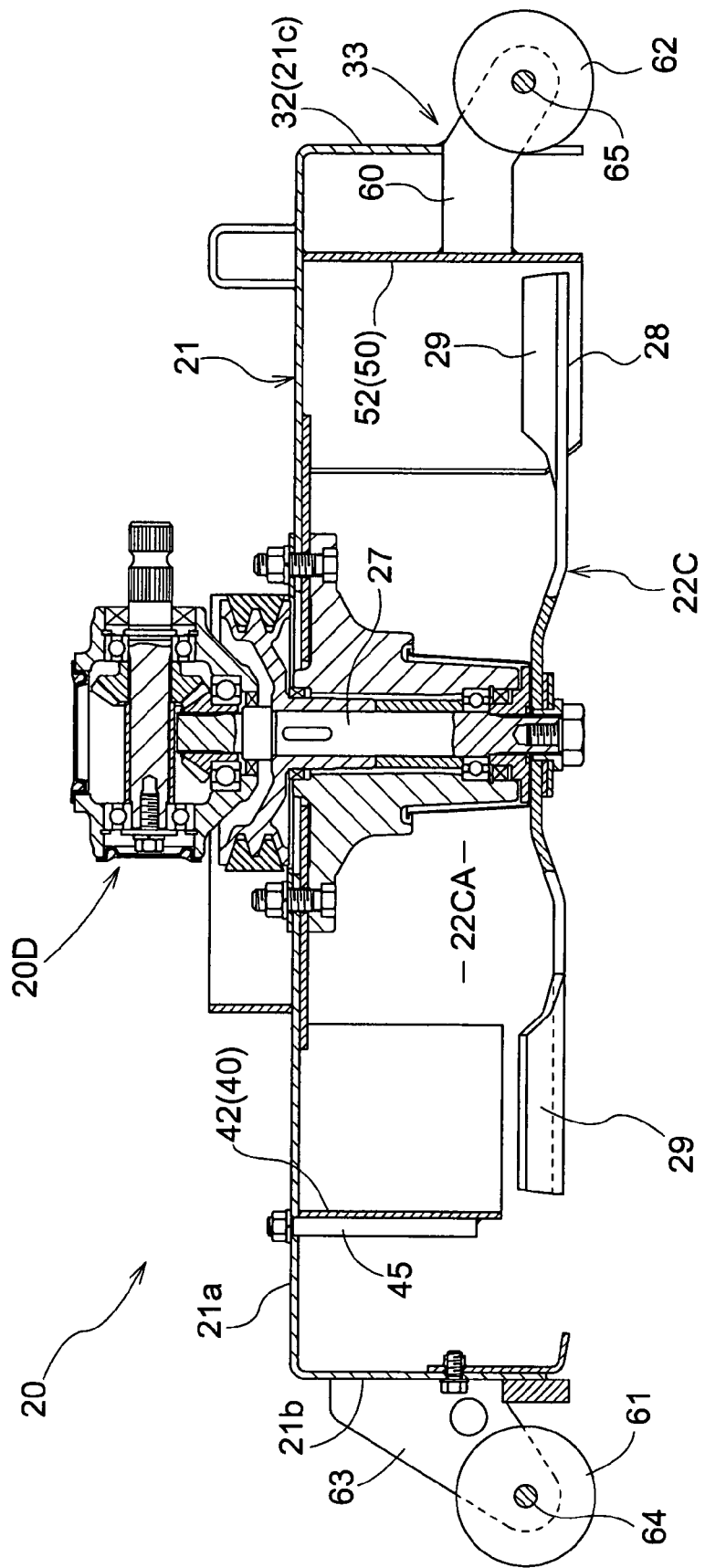
FIG. 5 is a longitudinal side view showing the mower.

As shown in FIGS. 3, 4, and 5, the rear pair of left and right ground rollers 62, 62 is supported so as to be capable of rotating via a support shaft 65 in a position to the rear of the ventilation hole 33 of the pair of left and right support members 60, 60 connected between the rear baffle plate 50 and the linear middle wall portion 32. When a protrusion in the ground surface or another obstacle is encountered, the rear pair of left and right ground rollers 62, 62 rolls over the obstacle while supporting the rear end of the cutting blade housing 21 near the ground so as not to strike the obstacle. The pair of left and right ground rollers 62, 62 is supported in an arrangement in which the ground rollers 62 completely protrude to the rear of the ventilation hole 33 so as not to obstruct the airflow.

Other Embodiments

The present invention can be applied in a mower that has two rotating cutting blades, as well as in a mower that has three rotating cutting blades as described in the abovementioned embodiment. The present invention can also be applied to a front plate portion that corresponds to any pair of rotating cutting blades that are adjacent to each other in the flow direction of cut grass in a mower provided with four or more rotating cutting blades. Accordingly, the uppermost cutting blade 22L is referred to as an upstream-side cutting blade, the center cutting blade 22C is referred to as a downstream-side cutting blade, the uppermost cutting blade plate portion 41 is referred to as the plate portion for the upstream-side cutting blade, and the center cutting blade plate portion 42 is referred to as the plate portion for the downstream-side cutting blade.

What is claimed is:

1. A mower comprising:
a cutting blade housing that opens downward and has a forward direction, and has a top plate and a front vertical wall that depends from the top plate, said cutting blade housing being provided with a cut-grass discharge port;
rotating cutting blades that are arranged in a transverse direction of said cutting blade housing and each of which is capable of rotating about a vertical axis inside the cutting blade housing; and
a front baffle plate disposed forwardly of a rotation zone of said rotating cutting blades so as to guide a flow of cut grass towards said cut-grass discharge port from said rotating cutting blades; wherein
said front baffle plate comprises:
an upstream-side cutting blade plate portion having a curved guide surface that conforms to a rotation trajectory of an upstream-side cutting blade that is one of a pair of adjacent rotating cutting blades and is disposed upstream with respect to a cut grass flow direction, a portion of the upstream-side cutting blade plate portion that extends up to a boundary point defining an end thereof being shaped to curve toward the axis of the upstream-side cutting blade; and
a downstream-side cutting blade plate portion extending from the upstream-side cutting blade plate portion at the boundary point and having a concave curved guide surface that corresponds to a rotation zone of a downstream-side cutting blade that is the other of said pair of adjacent rotating cutting blades and is disposed downstream with respect to a cut grass flow direction; and wherein
the front baffle plate is configured such that the distance between a rotation zone of said upstream-side cutting blade and the boundary point between said upstream-side cutting blade plate portion and said downstream-side cutting blade plate portion in said baffle plates is greater than the distance between said boundary point and a rotation zone of said downstream-side cutting blade; and the distance between a rotation zone of said upstream-side cutting blade and a portion of the upstream-side cutting blade plate portion from a vicinity of a position in which a rotation trajectory of said upstream-side cutting blade intersects with an imaginary line that extends perpendicular to said forward direction and through a center axis of said upstream-side cutting blade to said boundary point gradually increases toward said boundary.

2. The mower according to claim 1, wherein said upstream-side cutting blade plate portion is configured such that an extension line that extends from said boundary along said curved guide surface of said upstream-side cutting blade plate portion passes through a rotation zone of said downstream-side cutting blade.

3. The mower according to claim 2, wherein said upstream-side cutting blade plate portion is configured such that an extension line that extends from said boundary along said curved guide surface of said upstream-side cutting blade plate portion passes through a rotational axis region of said downstream-side cutting blade.

4. The mower according to claim 3, wherein said rotational axis region is a region within a circle having a radius of 5 cm from said rotational axis.

5. The mower according to claim 1, further comprising:
a rear baffle plate that is disposed rearwardly of said cutting blades and has a shape that conforms to the rotation zones of said cutting blades; wherein
said rear baffle plate has a forward end portion that protrudes forward in a region between a rotation zone of said upstream-side cutting blade and a rotation zone of said downstream-side cutting blade; and
said boundary is disposed in a position such that a straight line that connects said boundary and said forward end portion enters a rotation zone of said downstream-side cutting blade.

6. The mower according to claim 1, wherein:
an arcuate shape is adopted for the portion of said upstream-side cutting blade plate portion that extends between said boundary and a vicinity of a position at which a rotation trajectory of said upstream-side cutting blade intersects with an imaginary line that extends perpendicular to said forward direction and passes through an axis of said upstream-side cutting blade.

7. The mower according to claim 1, wherein:
said mower has three rotating cutting blades;
a plate portion of said front baffle plate that is disposed forwardly of a rotation zone of a cutting blade that is closest to said cut-grass discharge port and is one of said rotating cutting blades, and is also disposed forwardly of a rotation zone of a cutting blade adjacent to the cutting blade closest to said cut-grass discharge port, comprises a curved plate portion that is curved in a forward-rearward direction of a cutting blade housing, in a connecting point disposed forwardly either of a rotation zone of the blade closest to said cut-grass discharge port, or of a rotation zone of said adjacent cutting blade; and
a downstream-side plate portion disposed further down in a flow guide direction than said connecting point of said plate portion is disposed further forward than a straight line that passes through said connecting point and a flow guide endpoint of the downstream-side plate portion.

8. The mower according to claim 7, wherein
said front baffle plate is configured such that an extension of a tangent line, in a vicinity of said connecting point of the portion of said front baffle plate that corresponds to a cutting blade adjacent to the cutting blade closest to said cut-grass discharge port, passes forwardly of a rotation zone of the cutting blade closest to said cut-grass discharge port.

9. A mower comprising:
a cutting blade housing that opens downward and has a top plate and a front vertical wall that depends from the top plate, wherein said cutting blade housing has a cut-grass discharge port in one transverse end portion thereof;
rotating cutting blades that are arranged in a transverse direction of said cutting blade housing and each of which is capable of rotating about a vertical axis inside the cutting blade housing; and
a front baffle plate disposed forwardly of rotation zones of said rotating cutting blades so as to guide a flow of cut grass towards said cut-grass discharge port from said rotating cutting blades, wherein
said front baffle plate is configured such that a connecting point at which a first baffle plate portion, which is positioned forwardly of a rotation zone of a cutting blade that is closest to said cut-grass discharge port and that is one of said plurality of rotating cutting blades, is connected to a second front baffle plate portion positioned forwardly of a rotation zone of a cutting blade adjacent to the cutting blade closest to said cut-grass discharge port is disposed forwardly of the rotation zone of said adjacent cutting blade, and the first baffle plate portion have a shape that curves in a forward-rearward direction of the cutting blade housing; and
the first baffle plate portion is curved further forward than a straight line that passes through said connecting point and a flow guide endpoint of the first baffle plate portion, and wherein
the second front baffle plate portion has a straight portion extending from a region of a forward most area of the rotation zone of said adjacent cutting blade toward the cut-grass discharge port, and the connecting point forms an end of the straight portion.

10. The mower according to claim 9, wherein
said connecting point is disposed in a portion of the front baffle plate facing a rotation zone of the adjacent cutting blade at a position laterally toward said cut-grass discharge port with respect to an axis of rotation of a cutting blade.

11. The mower according to claim 9, further comprising:
a rear baffle plate that is disposed rearwardly of said cutting blades and has a shape that conforms to the rotation zones of said cutting blades; wherein
said rear baffle plate has a forward end portion that protrudes forward in a region between a rotation zone of said adjacent cutting blade and a rotation zone of a blade closest to said cut-grass discharge port; and
said connecting point is disposed in a position such that a straight line that connects said connecting point and said forward end portion enters a rotation zone of said adjacent cutting blade.

12. The mower according to claim 9, wherein
said front baffle plate is configured such that an extension of a tangent line in a vicinity of said connecting point of the portion of the front baffle plate that corresponds to a cutting blade adjacent to the cutting blade closest to said cut-grass discharge port passes forwardly of a rotation zone of the cutting blade closest to said cut-grass discharge port.

13. A mower comprising:
a cutting blade housing that opens downward and has a top plate and a front vertical wall that depends from the top plate, wherein said cutting blade housing has a cut-grass discharge port in one transverse end portion thereof;
rotating cutting blades that are arranged in a transverse direction of said cutting blade housing and each of which is capable of rotating about a vertical axis inside the cutting blade housing; and a front baffle plate disposed forwardly of rotation zones of said rotating cutting blades so as to guide a flow of cut grass towards said cut-grass discharge port from said rotating cutting blades, wherein said front baffle plate is configured such that a connecting point at which a first baffle plate portion, which is positioned forwardly of a rotation zone of a cutting blade that is closest to said cut-grass discharge port and that is one of said plurality of rotating cutting blades, is connected to a second front baffle plate portion positioned forwardly of a rotation zone of a cutting blade adjacent to the cutting blade closest to said cut-grass discharge port is disposed forwardly of the rotation zone of said adjacent cutting blade, and the first baffle plate portion have a shape that curves in a forward-rearward direction of the cutting blade housing; and an extension of a tangent line in a vicinity of said connecting point of the second baffle plate portion passes forwardly of a rotation zone of the cutting blade closest to said cut-grass discharge port, and wherein the second front baffle plate portion has a straight portion extending from a region of a forward most area of the rotation zone of said adjacent cutting blade toward the cut-grass discharge port, and the connecting point forms an end of the straight portion.

14. The mower according to claim 13, wherein the first baffle plate portion is curved further forward than a straight line that passes through said connecting point and a flow guide endpoint of the first baffle pate portion.

* * * * *

UNITED STATES PATENT AND TRADEMARK OFFICE
CERTIFICATE OF CORRECTION

| | |
|---|---|
| PATENT NO. | : 7,437,865 B2 |
| APPLICATION NO. | : 11/726370 |
| DATED | : October 21, 2008 |
| INVENTOR(S) | : Koike et al. |

It is certified that error appears in the above-identified patent and that said Letters Patent is hereby corrected as shown below:

Column 12, Line 14, Claim 14, "baffle pate" should read -- baffle plate --

Signed and Sealed this

Twenty-fourth Day of February, 2009

JOHN DOLL
*Acting Director of the United States Patent and Trademark Office*